United States Patent
Galgali et al.

(10) Patent No.: US 8,838,701 B2
(45) Date of Patent: Sep. 16, 2014

(54) AUTOMATIC CATEGORIZATION OF EMAIL IN A MAIL SYSTEM

(75) Inventors: Pallavi V Galgali, Maharashtra (IN); Ujjwal Lanjewar, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 1352 days.

(21) Appl. No.: 12/147,755

(22) Filed: Jun. 27, 2008

(65) Prior Publication Data

US 2009/0327192 A1 Dec. 31, 2009

(51) Int. Cl.
*G06F 15/16* (2006.01)
*G06Q 10/00* (2012.01)

(52) U.S. Cl.
CPC .................................. *G06Q 10/00* (2013.01)
USPC ........................ 709/206; 709/207; 707/828

(58) Field of Classification Search
CPC .. H04L 12/5885; H04L 51/18; G06Q 10/107; G06F 17/30091; G06F 17/30115
See application file for complete search history.

(56) References Cited

U.S. PATENT DOCUMENTS

| | | | | |
|---|---|---|---|---|
| 6,057,841 | A * | 5/2000 | Thurlow et al. | 715/809 |
| 6,490,574 | B1 * | 12/2002 | Bennett et al. | 706/47 |
| 6,678,705 | B1 * | 1/2004 | Berchtold et al. | 1/1 |
| 6,721,784 | B1 * | 4/2004 | Leonard et al. | 709/206 |
| 6,941,304 | B2 | 9/2005 | Gainey et al. | |
| 7,237,009 | B1 * | 6/2007 | Fung et al. | 709/206 |
| 7,328,244 | B1 * | 2/2008 | Kelley | 709/206 |
| 2002/0023135 | A1 * | 2/2002 | Shuster | 709/206 |
| 2002/0178224 | A1 * | 11/2002 | Kasajima | 709/206 |
| 2003/0131060 | A1 * | 7/2003 | Hartselle et al. | 709/206 |
| 2004/0044746 | A1 * | 3/2004 | Matsusaka | 709/217 |
| 2004/0117451 | A1 * | 6/2004 | Chung | 709/207 |
| 2005/0198153 | A1 * | 9/2005 | Keohane et al. | 709/206 |
| 2006/0026236 | A1 * | 2/2006 | Scian et al. | 709/206 |
| 2006/0168046 | A1 * | 7/2006 | Qureshi | 709/206 |
| 2006/0277195 | A1 * | 12/2006 | Schulz et al. | 707/10 |
| 2007/0130127 | A1 * | 6/2007 | Passmore et al. | 707/3 |
| 2009/0125528 | A1 * | 5/2009 | Choi | 707/100 |
| 2009/0164588 | A1 * | 6/2009 | D'Amato et al. | 709/206 |
| 2009/0240774 | A1 * | 9/2009 | Sachtjen et al. | 709/206 |

FOREIGN PATENT DOCUMENTS

WO WO0116695 3/2001

OTHER PUBLICATIONS

Title : Automated email processing rules https://arl.org/Guide/QueueRules.html), (May 30, 2008).
Title: Automatic Categorization of Email into Folders: Benchmark Experiments on Enron and SRI Corpora Author: Ron Bekkerman ronb@cs.umass.edu Department of Computer Science University of Massachusetts, Amherst, USA. Andrew McCallum mccallum@cs.umass.edu Department of Computer Science University of Massachusetts, Amherst, USA, Gary Huang ghuang@cs.umass.edu Department of Computer Science University of Massachusetts, Amherst, USA, (2005).

* cited by examiner

*Primary Examiner* — Daniel Kinsaul
(74) *Attorney, Agent, or Firm* — Garg Law Firm, PLLC; Rakesh Garg; Parashos Kalaitzis

(57) ABSTRACT

A sender-driven framework for enhancing the categorization of emails, wherein the sender is able to create or define rules that refine or augment those at the receiver's end. Particularly, the sender is enabled, in accordance with at least one embodiment of the present invention, to add information relating to the context of an email, which can help streamline categorization at the receiver's end.

18 Claims, 2 Drawing Sheets

AUTOMATIC CATEGORIZATION OF EMAIL IN A MAIL SYSTEM

FIELD OF THE INVENTION

The present invention relates generally to methods and arrangements for handling and categorizing email.

BACKGROUND OF THE INVENTION

In today's era of information overflow, email users face a side effect, which is the difficulty in managing pile of emails to use them effectively. It is a common task to categorize mails into mail folders so that mail searches can be performed on a subset of mails present in the mail box, for effective mail search results.

Generally, it is important to categorize emails efficiently so that it provides convenient subsets of intended or desired emails while leaving unwanted or unintended emails out of such categorization. However, while many methods have been developed to categorize mails, but none has proven efficient enough to take the actual context from the mail and use it for storing mails in a folder.

Apart from performing mail categorization manually into various folders, one of the known methods for categorizing mails is based on 'rules'. Here, users define rules to redirect the incoming mails into one of the folders based on a criterion, such as sender, subject, mail contents, etc. However, no matter how refined the rules are, there are always some incoming mails which do not satisfy the rules and users end up needing to define additional rules for them. This process continues and number of rules grows without leading to a definite end. As number of rules relax to include more mails (which were not otherwise reaching "target" folders), the risk of inviting an even greater number of unwanted emails clearly increases.

Chief among the problems with known systems is that only very basic metadata and data/contents of mails are used for mail categorization. However, this misses out on the context of different emails, which can often be even more important in achieving successful categorization. However, context is often missed when something as rudimentary as a subject line is different between emails.

Another problem is that a mail sender does not have a role to play in mail categorization at the receiving end, even though the sender will likely be aware of the context of the email reasonably accurately.

Accordingly, a compelling need has been recognized in connection with providing even more efficient and effective email categorization, to the point of keeping such categorization virtually seamless at the receiver's end.

SUMMARY OF THE INVENTION

Broadly contemplated herein, in accordance with at least one presently preferred embodiment of the present invention, is a sender-driven framework for enhancing the categorization of emails, wherein the sender is able to create or define rules that refine or augment those at the receiver's end. Particularly, the sender is enabled, in accordance with at least one embodiment of the present invention, to add information relating to the context of an email, which can help streamline categorization at the receiver's end.

In summary, one aspect of the invention provides a method comprising: applying a rule to email at a sending end; and employing the rule to direct automatic categorization of the email at a receiving end.

Another aspect of the invention provides an apparatus comprising: a rule applier which permits application of a rule to email at a sending end; and a rule manager which employs the rule to direct automatic categorization of the email at a receiving end.

Furthermore, an additional aspect of the invention provides a program storage device readable by machine, tangibly embodying a program of instructions executable by the machine to perform a method comprising: applying a rule to email at a sending end; and employing the rule to direct automatic categorization of the email at a receiving end.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
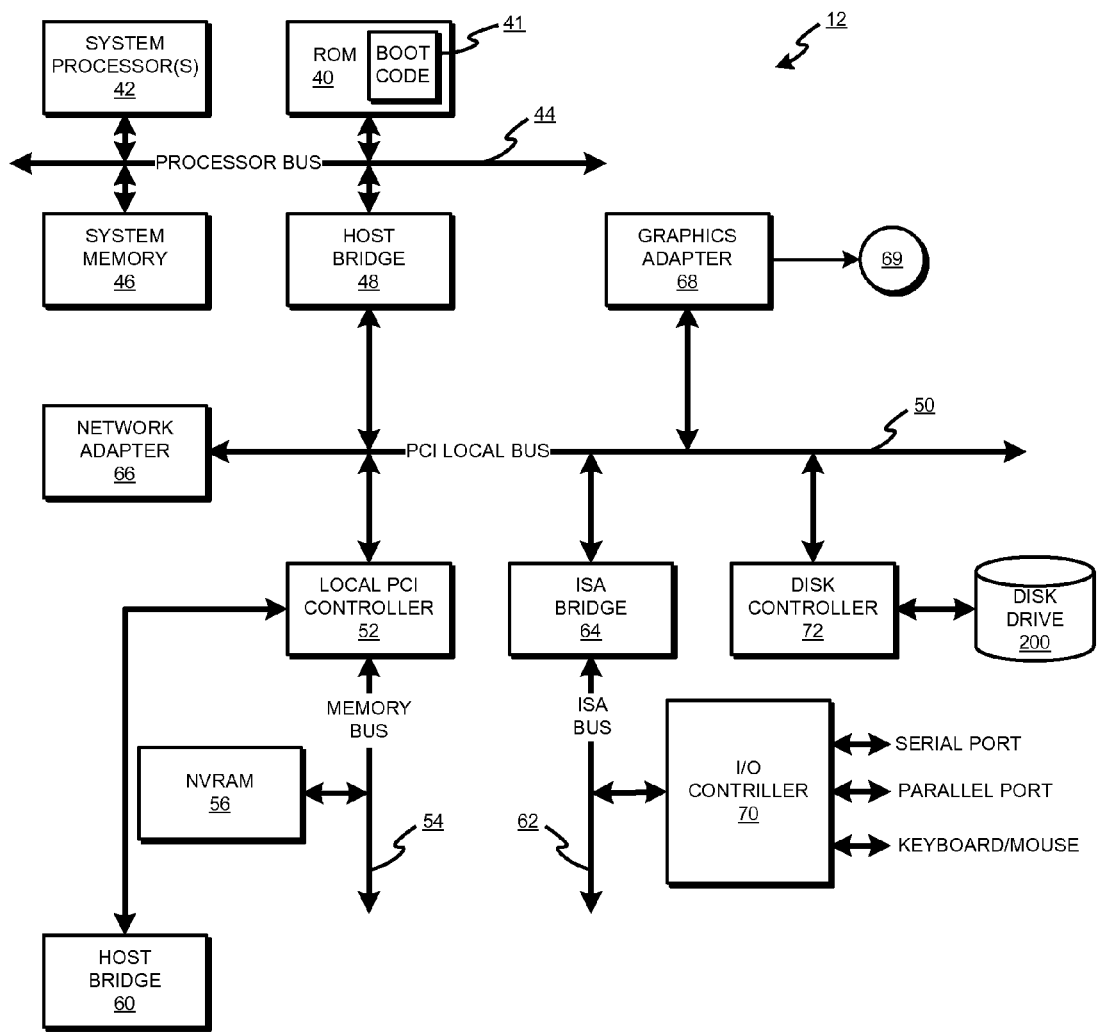
FIG. 1 schematically illustrates a computer system with which a preferred embodiment of the present invention can be used.
Figure 2:
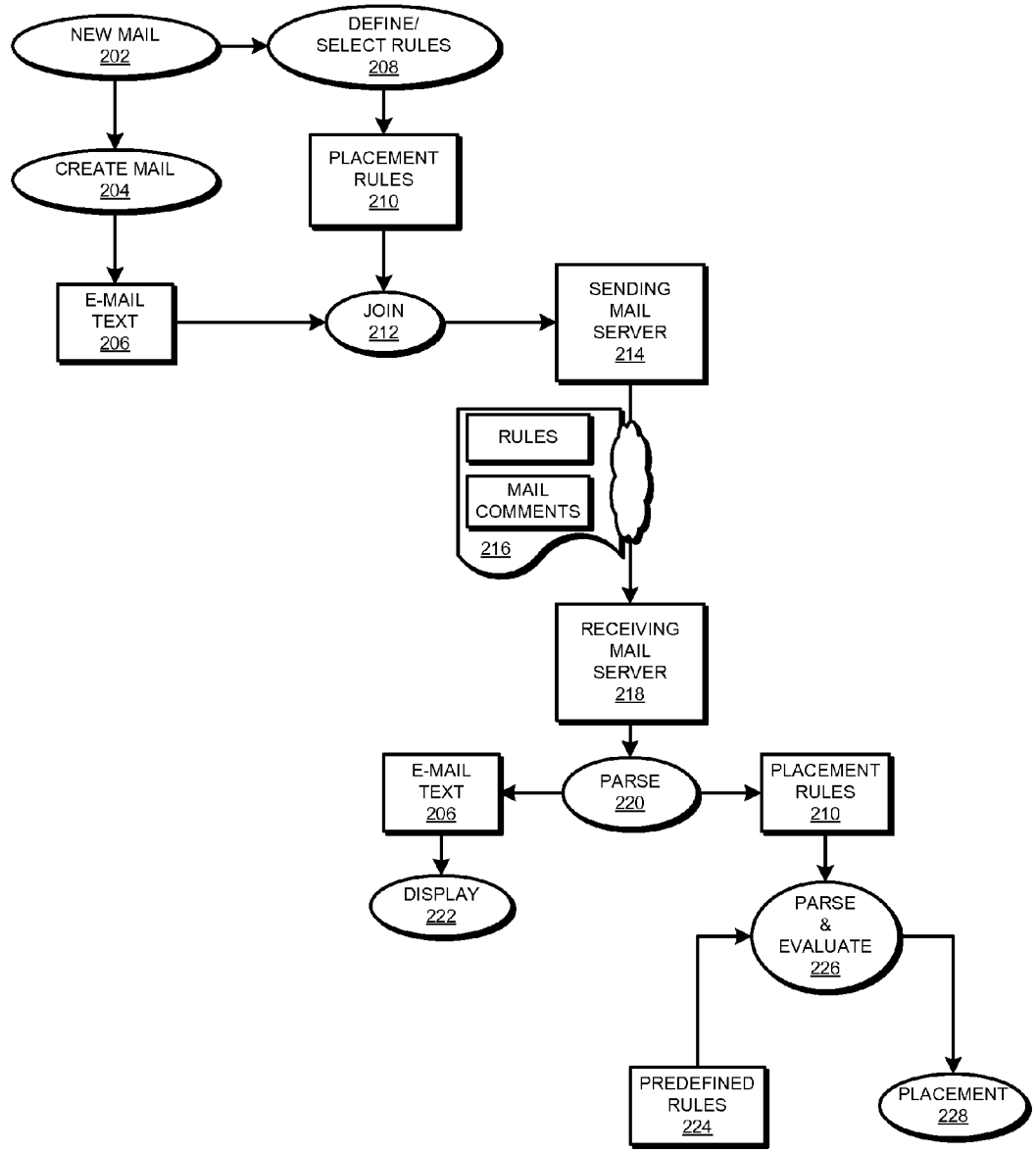
FIG. 2 illustrates an arrangement for handling and categorizing email.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1-2, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers previously sold by the International Business Machines Corporation of Armonk, N.Y., and now sold by Lenovo (US) Inc. of Morrisville, N.C.; however, as will become apparent from the following description, the present invention is applicable to any data processing system. Notebook computers, as may be generally referred to or understood herein, may also alternatively be referred to as "notebooks", "laptops", "laptop computers" or "mobile computers".

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a local area network (LAN), and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports, including communication over a wide area network (WAN) such as the Internet. A disk controller 72 is in communication with a disk drive 200 for accessing external memory. Of course, it should be appreciated that the system 12 may be built with different chip sets and a different bus structure, as well as with any other suitable substitute components, while providing comparable or analogous functions to those discussed above.

An email interface for a computer system, such as a system 12 illustrated by way of a non-restrictive example in FIG. 1, can be disposed essentially anywhere deemed appropriate, such as in operative communication with network adapter 66. Reference now will be made to FIG. 2, which illustrates an arrangement for handling and categorizing email in accordance with a preferred embodiment of the present invention.

As can be appreciated from FIG. 2, a sender may preferably associate one or more rules with the mail 202 being sent from the sending-mail server 214 to a receiving-mail server 218. This association may be accomplished either by manually adding one or more such rules every time before sending or by performing a one-time rules configuration in the software.

Rules are generic and can be used to represent any information sender likes to be considered in categorization, similar to the way they are defined at the client end. In summary, rules can preferably be defined at the sender end, sent with mail as additional meta information and then be executed at the receiver end, just like a normal rule would execute. (However, receivers could of course have rights to override this behavior and not run a sender's rule if so desired.)

The disclosure now turns to a series of steps that may be executed, by way of an illustrative and non-restrictive example. Reference may continue to be made to FIG. 2.

First, the act of generally preparing a new email at the sender's end (202) involves creating an e-mail 204 which, per usual, involves desired email text 206, if any. (Alternatively, instead of just text, there could be, e.g., a picture, hyperlink or attachment with or without without accompanying email text.) At the sender's end, one or more rules to be placed in the email (210) is/are preferably associated with the email either manually or by way of selecting one of an existing list of predefined rules (208). For instance, it may be intended that the mail go into a specific folder (say, 'HR & Admin') of a receiver's mailbox. One can associate a rule with the mail being sent, as:

rule A condition=nil, placement_folder="HR & Admin"

This means that mail is intended to be placed into folder "HR & Admin" unconditionally.

The rule can take following syntax:

```
Rule: RULE rule_name condition_list action_list
condition_list:     { NILL | condition {AND|OR} condition_list }
    condition: CONDITION
{SUBJECT|TO|FROM|CC|BCC|IMPORTANCE|BODY|PRIORITY|
SIZE}
                    {CONTAINS|DOESN'T CONTAIN|IS|ISNOT}
value
    action_list: { NILL | action {AND|OR} action_list }
    action: ACTION {
            {PLACE|COPY} folder1[,folder2[,folder3 ...]] |
            { SETEXPIRY|IMPORTANCE} value
            { DELETE}
        }
```

In a subsequent step, mail software preferably embeds (or joins) rules into the meta data information attached with mail being sent (212), and the ensemble 216 is then sent from the sending server 214 to the receiving server 218. If no rules are specified by sender then no rules are associated with the mail.

Mail is then received at the receiving end 218 and the email is parsed (220) so as to essentially separate the email text 206 and placement rule(s) 210 from one another. Thence, any action associated with the placement rule(s) 210 of the mail is executed, e.g. if mail is configured to be:

placed in folder 'HR & Admin', then it will be placed in said folder if the folder exists, or create a folder if the folder does not exist.

copied to 'HR & Admin', then it will be copied from inbox to the mentioned folder if condition satisfies. In other words, the rule could (for instance) appear as: rule B condition=(Importance=HIGH, DOESN'T CONTAIN ATTACHMENT), COPY="HR & Admin". The condition, as shown, is associated with the rule, with the following definition to result: condition= (Importance=HIGH, DOESN'T CONTAIN ATTACHMENT). Accordingly, if the condition is true (i.e., importance is high), then a predetermined action can be taken (i.e., copy to folder "HR & Admin").

deleted based on the condition, it would be deleted upon execution of rule (the recipient can be given a chance to read mail once, depending on the implementation).

set a mail configuration, e.g. expiry, then the configuration would be applied accordingly.

To the extent that any rule does not prevent the email text 206 from being displayed, the email text 210 indeed appears at one or more displays 222 at the receiving end. On the other hand, in terms of executing or employing the placement rule(s) 210, the receiving-end mail system can well be configured to forbid or override the rule embedded into the mail by its own (receiver-end) rule, and/or to facilitate this new feature as an optional feature (in other words, facilitate a new "incoming" rule as a new optional feature for the receiver end). The receiver end could also be configured to avoid execution of any "incoming" rules, if a user at the receiving end so desires. Additionally, if the execution of "incoming" rules is disabled, the receiver's mail system could allow the receiver to still use an incoming rule as a "hint" whenever he/she wishes to categorize mail in some folder by, e.g., suggesting a folder name from the one obtained from the rule, or trying to find a "closest matching" folder (based on, e.g., synonyms of a word in the rule) from available folders at the receiver's end and then suggest such a "closest matching" folder for categorization.

Generally, then, as shown in FIG. 2, the placement rule(s) 210 can be parsed and evaluated in the context of predefined rules 224 already in effect or made available at the receiving end, along the lines just discussed. In other words, predefined rules 224 can mandate the forbidding or overriding of placement rule(s) 210, or present placement rule(s) 210 to the receiving-end user as an optional feature, or simply suppress placement rule(s) 210 by way of a standing (receiving-end) rule that suppresses all incoming rules. Of course, there are a very wide variety of other possible modifications that could be made to incoming placement rule(s) 210 in light of predefined receiving-end rules 224, which are by no means limited by the foregoing discussion or by any other discussion herein.

Finally, once the placement rule(s) 210 has/have been parsed and evaluated, and possibly even modified, one or more rules is/are excecuted (or placed) (226) in accordance with the parsing or evaluation or, if so directed, is, e.g., deleted, ignored or suppressed.

By way of advantages, a system configured in accordance with at least one preferred embodiment of the present invention provides additional powers to the mail sender in driving the correct mail categorization, as he/she will likely know the email context better than the receiver does. Further, the system can be easily integrated into an existing mail system.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method comprising:
  associating a first rule to email at a sending end; and
  employing the first rule to direct automatic categorization of the email at a receiving end, the employing comprising:
    evaluating a condition specified in the first rule, the condition being dependent upon a content of the email that is different from data of the first rule; and
    executing the first rule responsive to the condition being satisfied, wherein the first rule is used as a hint in a second rule existing at the receiver end, wherein the first rule suggests a first folder for the automatic categorization, and wherein the automatic categorization uses the hint to find a second folder, which is closest matching to the first folder, from a plurality of available folders at the receiving end, wherein a name of the first folder includes a word, and the second folder is closest matching to the first folder for including a synonym of the word in a name of the second folder.

2. The method according to claim 1, wherein said employing comprises augmenting a preexisting third rule at the receiving end with the first rule associated at the sending end.

3. The method according to claim 1, wherein said employing comprises subjecting the first rule to modification at the receiving end.

4. The method according to claim 3, wherein said subjecting comprises availing the first rule for optional employment at the receiving end.

5. The method according to claim 1,
  wherein employing the first rule causes the email to be deleted after displaying once.

6. The method according to claim 1, wherein employing the first rule comprises, based on evaluating the condition, deleting the first rule.

7. An apparatus comprising:
  a storage device including a storage medium, wherein the storage device stores computer usable program code; and
  a processor, wherein the processor executes the computer usable program code, and wherein the computer usable program code comprises:
    computer usable code for a rule applier which associates a first rule to email at a sending end; and
    computer usable code for a rule manager for employing the first rule to direct automatic categorization of the email at a receiving end, the computer usable code for the rule manager for employing the first rule comprising:
      computer usable code for evaluating a condition specified in the first rule, the condition being dependent upon a content of the email that is different from data of the first rule; and
      computer usable code for executing the first rule responsive to the condition being satisfied, wherein the first rule is used as a hint in a second rule existing at the receiver end, wherein the first rule suggests a first folder for the automatic categorization, and wherein the automatic categorization uses the hint to find a second folder, which is closest matching to the first folder, from a plurality of available folders at the receiving end, wherein a name of the first folder includes a word, and the second folder is closest matching to the first folder for including a synonym of the word in a name of the second folder.

8. The apparatus according to claim 7, wherein said computer usable code for the rule manager acts to augment a preexisting Uthird rule at the receiving end with the first rule associated at the sending end.

9. The apparatus according to claim 7, wherein said computer usable code for the rule manager acts to subject the first rule to modification at the receiving end.

10. The apparatus according to claim 9, wherein said computer usable code for the rule manager acts to avail the first rule for optional employment at the receiving end.

11. The apparatus according to claim 7, wherein employing the first rule causes the email to be deleted after displaying once.

12. The apparatus according to claim 7, wherein employing the first rule comprises, based on evaluating the condition, deleting the first rule.

13. A program storage device readable by machine, tangibly embodying a program of instructions executable by the machine to perform a method comprising:
associating a first rule to email at a sending end; and
employing the first rule to direct automatic categorization of the email at a receiving end, the employing comprising:
evaluating a condition specified in the first rule, the condition being dependent upon a content of the email that is different from data of the first rule; and
executing the first rule responsive to the condition being satisfied, wherein the first rule is used as a hint in a second rule existing at the receiver end, wherein the first rule suggests a first folder for the automatic categorization, and wherein the automatic categorization uses the hint to find a second folder, which is closest matching to the first folder, from a plurality of available folders at the receiving end, wherein a name of the first folder includes a word, and the second folder is closest matching to the first folder for including a synonym of the word in a name of the second folder.

14. The device according to claim 13, wherein said employing comprises augmenting a preexisting third rule at the receiving end with the first rule associated at the sending end.

15. The device according to claim 13, wherein said employing comprises subjecting the first rule to modification at the receiving end.

16. The device according to claim 13, wherein said subjecting comprises availing the first rule for optional employment at the receiving end.

17. The device according to claim 13, wherein employing the first rule causes the email to be deleted after displaying once.

18. The device according to claim 13, wherein employing the first rule comprises, deleting the first rule.

* * * * *